which the US009212606B2

(12) United States Patent
Alnafisah

(10) Patent No.: US 9,212,606 B2
(45) Date of Patent: Dec. 15, 2015

(54) BIRD STRIKE PREVENTION DEVICE FOR JET ENGINE, AND AIRPLANE INCORPORATING THE SAME

(71) Applicant: Khalid Hamad Mutleb Alnafisah, East Stroudsburg, PA (US)

(72) Inventor: Khalid Hamad Mutleb Alnafisah, East Stroudsburg, PA (US)

(*) Notice: Subject to any disclaimer, the term of this patent is extended or adjusted under 35 U.S.C. 154(b) by 0 days.

(21) Appl. No.: 14/140,136

(22) Filed: Dec. 24, 2013

(65) Prior Publication Data

US 2015/0176491 A1    Jun. 25, 2015

(51) Int. Cl.
```
B01D 46/48    (2006.01)
F02C 7/055    (2006.01)
B64D 33/02    (2006.01)
B01D 46/00    (2006.01)
B01D 46/10    (2006.01)
B01D 45/08    (2006.01)
F02C 7/04     (2006.01)
```

(52) U.S. Cl.
CPC ................. *F02C 7/055* (2013.01); *B01D 45/08* (2013.01); *B01D 46/0005* (2013.01); *B01D 46/10* (2013.01); *B64D 33/02* (2013.01); *F02C 7/04* (2013.01)

(58) Field of Classification Search
CPC ....................................................... F02C 7/055
USPC ............ 55/306, 434, 385.1, 490, 505; 95/267
See application file for complete search history.

(56) References Cited

U.S. PATENT DOCUMENTS

| | | | | |
|---|---|---|---|---|
| 2,928,497 A * | 3/1960 | Stockdale | ......................... | 55/306 |
| 2,944,631 A * | 7/1960 | Thomas et al. | .................. | 55/306 |
| 3,121,545 A * | 2/1964 | Meletion | ...................... | 244/53 B |
| 3,196,598 A * | 7/1965 | Olson | .............................. | 55/306 |
| 3,338,049 A * | 8/1967 | Fernberger | ................. | 60/39.092 |
| 3,871,844 A * | 3/1975 | Calvin, Sr. | ..................... | 55/306 |
| 3,998,048 A * | 12/1976 | Derue | ......................... | 60/39.092 |
| 5,411,224 A * | 5/1995 | Dearman et al. | ............ | 244/53 B |
| D433,029 S | 10/2000 | Eidson | | |
| 7,803,204 B1 | 9/2010 | Mladinich | | |
| 7,871,455 B1 * | 1/2011 | Sands et al. | ........................ | 95/1 |
| 8,429,890 B2 | 4/2013 | Matos | | |
| 8,657,895 B2 * | 2/2014 | Kline | ............................. | 55/306 |
| 8,945,255 B2 * | 2/2015 | Kline | ............................. | 55/309 |
| 2003/0033795 A1 * | 2/2003 | Lo | ............................... | 60/39.092 |
| 2006/0125701 A1 * | 6/2006 | Rotta | ........................... | 343/708 |
| 2007/0025838 A1 * | 2/2007 | Stelzer | ....................... | 415/121.2 |
| 2009/0016872 A1 * | 1/2009 | Anghileri | .................... | 415/121.2 |
| 2009/0101760 A1 * | 4/2009 | Ghogomu | ................... | 244/53 R |
| 2010/0003121 A1 * | 1/2010 | Berryann et al. | ................. | 415/1 |
| 2010/0180566 A1 * | 7/2010 | Matos | ......................... | 60/39.092 |
| 2010/0192834 A1 * | 8/2010 | Fogiel | ......................... | 116/22 A |

OTHER PUBLICATIONS

Matthew L. Wald, published Jan. 21, 2009; The New York Times: "Screens Not the Answer to Keep Birds Out of Jet Engines"; http://www.nytimes.com/2009/01/22/nyregion/22engines.html?_r=0.

* cited by examiner

*Primary Examiner* — Dung H Bui
(74) *Attorney, Agent, or Firm* — Oblon, McClelland, Maier & Neustadt, L.L.P.

(57) ABSTRACT

A bird strike prevention device for covering an air intake of a jet engine of an airplane includes a plurality of stays arranged to form a conical shape as a whole; and a joining portion configured to connect the plurality of stays to each other on an apex side of the conical shape. The plurality of stays is mounted on the jet engine near an outer edge of the air intake at a base of the conical shape. An axis of the conical shape coincides with a rotation axis of the jet engine. The number of the stays included in the plurality of stays is determined based on a minimum size of target birds to be prevented from striking the jet engine.

8 Claims, 9 Drawing Sheets

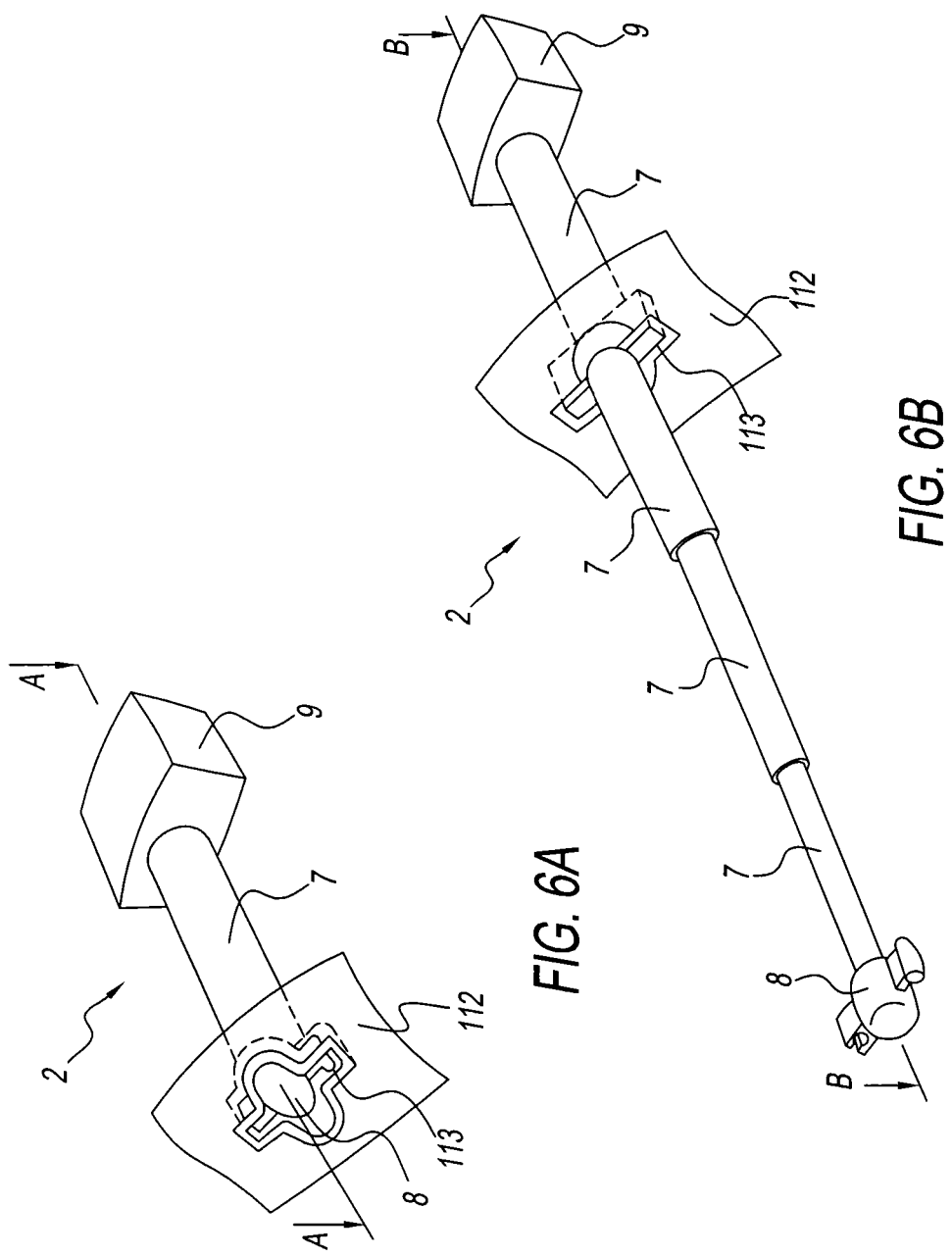

BIRD STRIKE PREVENTION DEVICE FOR JET ENGINE, AND AIRPLANE INCORPORATING THE SAME

GRANT OF NON-EXCLUSIVE RIGHT

This application was prepared with financial support from the Saudia Arabian Cultural Mission, and in consideration therefore the present inventor(s) has granted The Kingdom of Saudi Arabia a non-exclusive right to practice the present invention.

BACKGROUND

1. Field of the Disclosure

This disclosure relates generally to bird strike prevention devices, and jet engines and airplanes including bird strike prevention devices. More specifically, this disclosure relates to bird strike prevention devices to be mounted near air intakes of airplane jet engines to protect the jet engines against bird strikes, and jet engines and airplanes including such bird strike prevention devices.

2. Description of the Related Art

Airplanes, especially passenger airplanes, use jet engines to generate thrust for flights. The jet engine takes air in through an air intake to generates the thrust by chemical reaction between oxygen contained in the air and jet fuel. Thus, a large volume of airflow is required to operate the jet engine, and sometime a bird may be ingested with the airflow. This event is referred to as a bird strike.

Usually, airplane jet engines are designed so that the thrust can be maintained even when a bird up to a certain weight (typically up to eight pounds) is ingested. However, even with such a prevention measure against the bird strike, airplanes may still suffer damage and be forced to return to airports, resulting great financial losses. Accordingly, more effective bird strike prevention devices are desirable.

According to the New York Times (published Jan. 21, 2009, "Screens Not the Answer to Keep Birds Out of Jet Engines, by Matthew L. Wald), screening the front of jet engine is ineffective and dangerous because the engine needs a smooth airflow and the screen might break off and enter the engine a larger bird enters the engine.

The "background" description provided herein is for the purpose of generally presenting the context of the disclosure. Work of the presently named inventor, to the extent it is described in this background section, as well as aspects of the description which may not otherwise qualify as prior art at the time of filing, are neither expressly or impliedly admitted as prior art against the present invention.

SUMMARY

One aspect of this disclosure is to provide bird strike prevention devices capable of deflecting incoming birds that would be ingested into airplane jet engines unless they are deflected away from original courses. Another aspect is to provide jet engines and airplanes including such bird strike prevention devices.

In one embodiment, a bird strike prevention device for covering an air intake of a jet engine of an airplane includes: a plurality of stays arranged to form substantially a conical shape as a whole, and a joining portion configured to connect the plurality of stays to each other on an apex side of substantially the conical shape. The plurality of stays is mounted on the jet engine near an outer edge of the air intake at a base of substantially the conical shape. Further, an axis of substantially the conical shape substantially coincides with a rotation axis of the jet engine. Still further, the number of the stays included in the plurality of stays is determined based on a minimum size of target birds to be prevented from striking the jet engine.

The plurality of stays may be configured to cover the air intake in a first operation mode and uncover the air intake in a second operation mode. The joining portion may be composed of a plurality of catch portions wherein the catch portion is disposed on the apex side of each of the plurality of stay. The catch portions of the adjacent stays may be engaged with each other when the plurality of stays covers the air intake in the first operation mode and disengaged when the plurality of stays uncover the air intake in the second operation mode.

The bird strike prevention device may further include a driver mechanism configured to change positions of the plurality of stays relative to the air intake to change the operation mode between the first operation mode and the second operation mode.

The foregoing bird strike prevention device may be mounted on a jet engine of an airplane to deflect incoming birds that would be ingested into the jet engine unless they are deflected away from original courses.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 5A illustrates a state in which stays of the bird strike prevention device are stowed whereas FIG. 5B illustrates a state in which the stays are extended;

FIGS. 6A and 6B are perspective views illustrating details of the stay included in the bird strike prevention device according to the second embodiment, and FIG. 6A illustrates a state in which the stay is stowed whereas FIG. 6B illustrates a state in which the stay is extended;

FIG. 7A is the cross-sectional taken through line A-A of FIG. 6A whereas FIG. 7B is the cross-sectional view taken through line B-B of FIG. 6B;

DETAILED DESCRIPTION OF THE EMBODIMENTS

Figure 1:
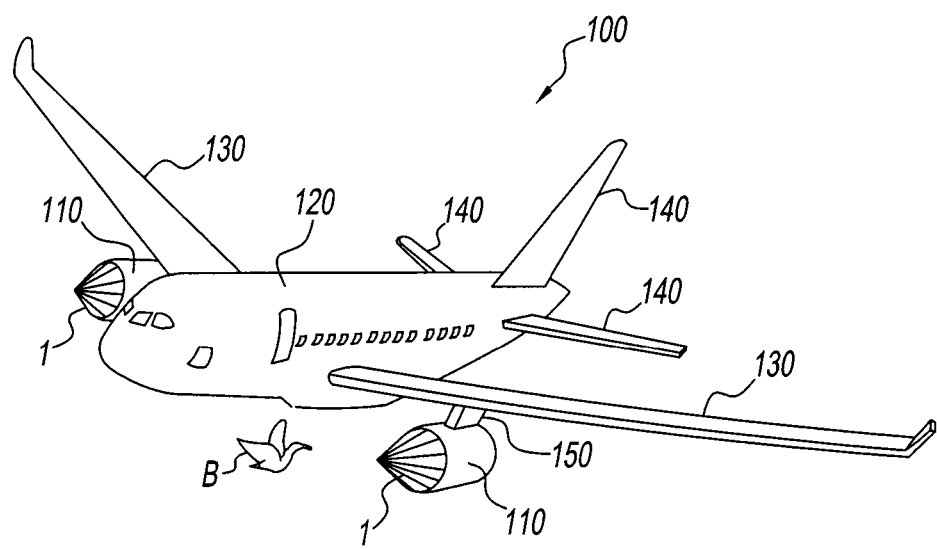
FIG. 1 is a perspective view illustrating an airplane including bird strike prevention devices according to a first embodiment.

Referring now to the drawings, wherein like reference numerals designate identical or corresponding parts throughout the several views.

First Embodiment

The first embodiment is now described with reference to FIG. 1 to FIG. 4. As illustrated in FIG. 1, in the present embodiment, an airplane 100 including bird strike prevention devices 1 is a passenger airplane and has two jet engines 110. FIG. 1 illustrates an exemplary situation where the airplane 100 is flying close to a bird B.

In the following description, a direction toward the nose of the airplane 100 will be referred to as a front direction, and a direction opposite to the front direction is referred to as a rear direction. Further, an up-down direction and a right-left direction are defined relative to a traveling direction of the airplane 100 or a viewing direction of a pilot operating the airplane 100.

Referring to FIG. 1, the airplane 100 includes jet engines 110, a fuselage 120, wings 130, and tails 140. The jet engines 110 are fixed under the right and left wings 130 with pylons 150. The bird strike prevention device 1 is mounted in the front of each jet engine 110. In this example, it is assumed that the bird B is flying to cut across in front of the airplane 100. While the airplane 100 is shown as a two engine commercial aircraft, the bird strike prevention device 1 can be used with any type of aircraft having one or more jet engines.

Figure 2:
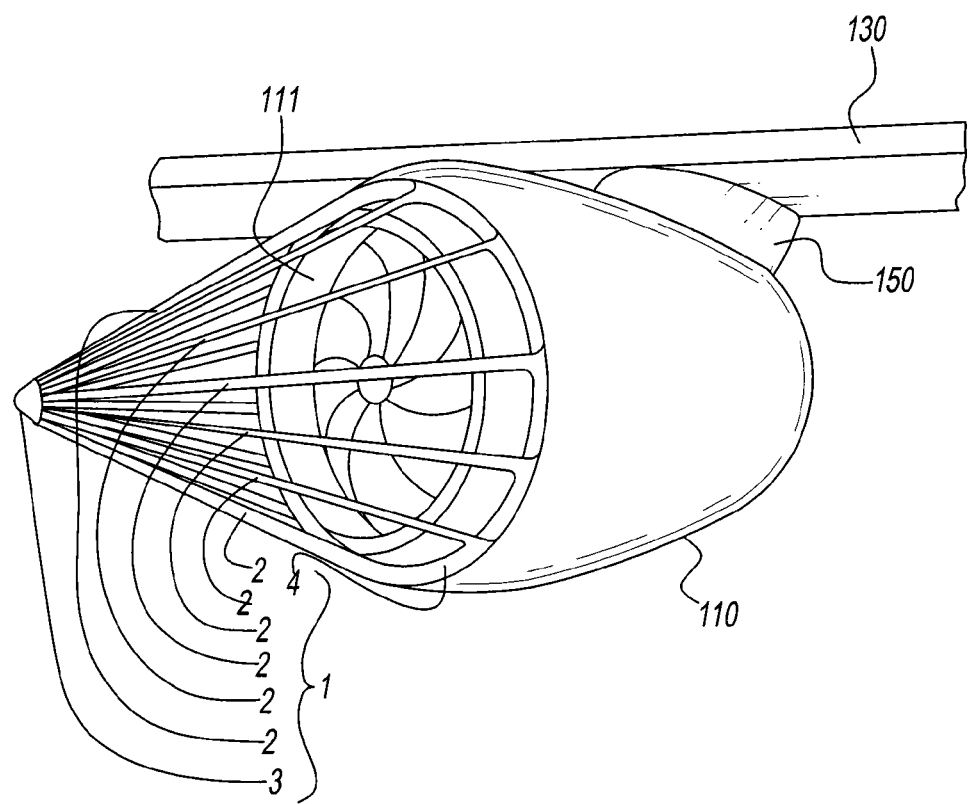
FIG. 2 is a perspective view illustrating an airplane jet engine on which a bird strike prevention device according to the first embodiment is mounted.

Referring to FIG. 2, the jet engine 110 is provided with an air intake 111. The air intake 111 is a circular opening to take in air and formed in the front of the jet engine 110. The bird strike prevention device 1 has substantially a multi-faceted conical shape and covers the air intake 111 in such a way that the axis of the bird strike prevention device 1 substantially coincides with the rotational axis of the jet engine 110.

Figure 3:
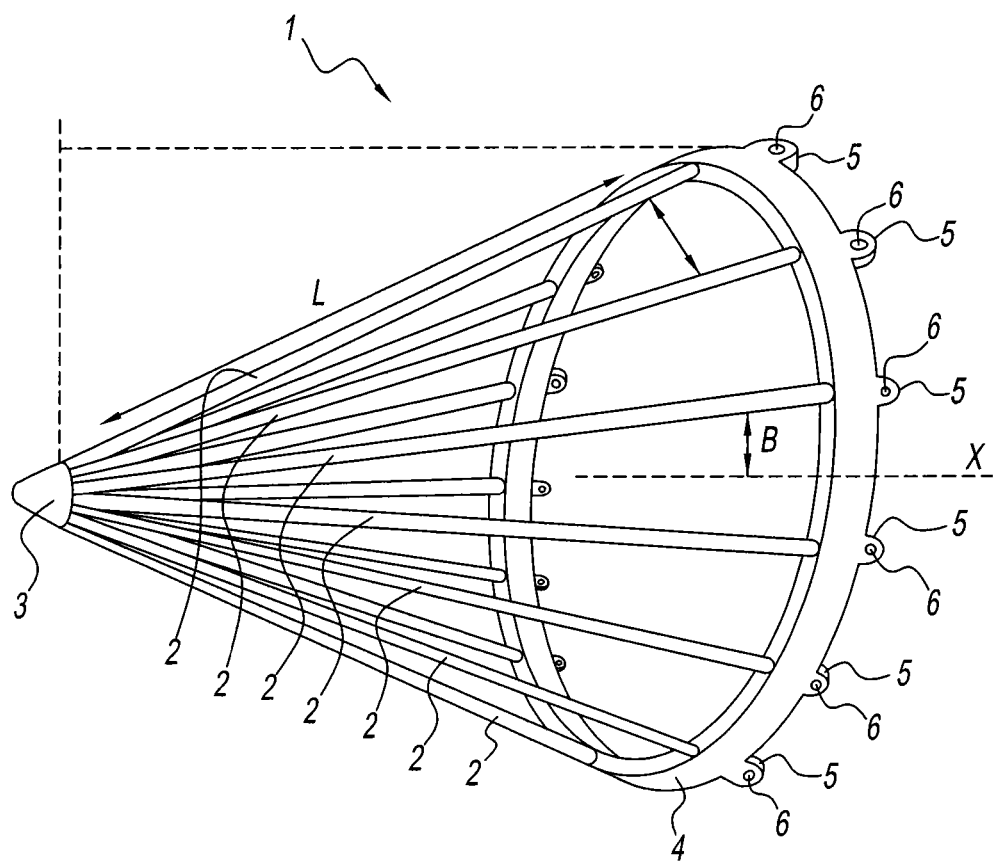
FIG. 3 is a perspective view illustrating a bird strike prevention device according to the first embodiment.

More specifically, referring to FIG. 3, the bird strike prevention device 1 has a multi-faceted conical shape as a whole and includes a plurality of stays 2, a cap 3, and a ring 4. The cap 3 is disposed at the tip of the conical shape, and the ring 4 is disposed at the base of the conical shape. In the example illustrated in FIG. 3, ten stays 2 are used to form the bird strike prevention device 1. However, the number of the stays 2 is not limited thereto, and a higher or lower number of the stays 2 may be used depending on the size of the air intake to cover and/or a minimum size of target birds to be deflected by the bird strike prevention device 1. For example, 9, 8, 7, 6, or 5 stays may be used. A larger number of stays adversely effects airflow, but too few stays allows for a larger opening size between stays (having a width "w" in FIG. 3) and weaker structural integrity. The size of the jet engine intake dictates the angle "α" for symmetrically spaced stays. The width w, is then a proportional fraction of 360 degrees, divided by the circumference of the engine intake.

As recognized by the present inventor, the spacing of the stays need not be a uniform distribution around the engine circumference. Instead a greater concentration of stays may be included at the bottom and top of the bird strike prevention device 1. A greater concentration (such as three) at the bottom, spaced between 20 and 45 degrees apart), and only one (or none) on the sides, helps guard against birds being sucked into the engine from below (typically when the aircraft is ascending). Similarly, three can be included at the top with only one (or none) on each side to protect against birds being sucked in from above, typically when the aircraft is descending. This asymmetrical distribution of stays 2 assists in reducing airflow disturbance (due to fewer number of obstructions in the airflow) while providing the greatest probably of bird deflection, recognizing that larger birds, such as Canadian Geese (typically 6 to 20 lbs.) are more often sucked in from either above or below, but not the sides of the engine due in part to the birds' flying patterns. Moreover, a Canadian Goose is less prone to enter an engine sideways, than head-on, from under, or from over.

So the bird strike prevention device 1 has enough structural integrity to withstand the bird strike of a larger bird (6 lbs or greater), the stays are made of solid aircraft grade aluminum, steel or titanium rods, which may or may not have a tear drop-shaped cross section to assist in preventing turbulent airflow. The length "L" of the stays are between 6 and 20 feet with the longer stays being used in embodiments that have fewer stays, such as the asymmetrical embodiment discussed above. Furthermore, the radial length "B" from the bottom of a stay 2 to a central axis "X" (FIG. 3) is dictated by the size of the entrance of the engine (about 100 inches for a commercial airliner). A departure angle between the cap 3 and the central axis "X" is determined by the length L and radial length "B". In one example, for a 10 foot stay, and a 4 foot engine radius, the departure angle between the cap 3 and each stay is roughly 25 degrees. Thus, an effective range of departure angles for stays between 6 and 20 feet with a 4 foot radius engine air intake are between 11.5 degrees and 41 degrees.

Figure 4:
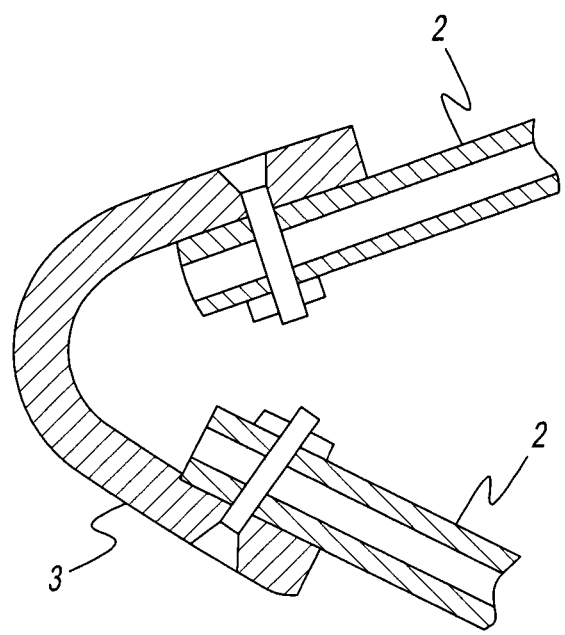
FIG. 4 is a side cross-sectional view illustrating a tip portion of the bird strike prevention device according to the first embodiment.

Referring to FIG. 4, the stays 2 are joined and connected to each other with the cap 3 at one end. In one embodiment, the stays 2 are fixed to the ring 4 at the other end with substantially equal spacing between adjacent stays 2. Fixing the stays 2 to the cap 3 (such as through a weld, or forged metal) and the ring 4 improves the structural integrity of the bird strike prevention device 1 and facilitates handling such as installation and de-installation of the bird strike prevention device 1 on the jet engine 110. As was prevosously discussed, and asymettrical distribution of stays may be used as well, such as more stays concentrated around the bottom and top of the device 1.

Referring back to FIG. 3, the ring 4 has a short tubular shape, on one side of which the stays 2 are fixed. On the other side of the ring 4, protruding connection portions 5 are formed. Connection holes 6 are formed in the protruding connection portions 5 near at respective centers thereof. The bird strike prevention device 1 is secured on the jet engine 110 by fixing the ring 4 to the jet engine 110 with fastening screws or rivets through the connection holes 6.

In the present embodiment, the bird strike prevention device 1 includes the stays 2, the cap 3, and the ring 4. It is preferable that these components are made of titanium alloys, for they are lighter in weight and higher in strength. Alternatively, materials other than the titanium alloys such as, for example, aluminum alloys, stainless-steel alloys, metals such as steel or the like, plastics, etc., may be used as the materials for these components, provided that such materials have sufficient strengths and are light weights. Further, the stays 2 may be made of resilient materials such as spring steel or the like.

The stay 2 may have a rod structure or a tube structure. The cross-section of the stay 2 may be a circular shape, a polygon shape such as triangle or rectangle, tear-drop or an oval shape. When the stay 2 is formed to have a triangle cross-sectional shape, it is preferable that the triangle is an acute triangle and a vertex thereof is directed to the front direction. According to such an arrangement, the resistance of airflow to the air intake 111 may be reduced, and turbulences in the airflow may be prevented from occurring or reduced.

As illustrated in FIG. 3 and FIG. 4, the stays 2 are joined to each other at the one end with the cap 3. Here, the cap 3 serves as a joining portion for connecting the adjacent stays 2 together as well as provides rigidity on the tip portion of the bird strike prevention device 1. The cap 3 enables to reduce impact resistance and help smooth the deflection of a bird when the bird directly hits the cap 3.

Each of the stays 2 may not need to have high structural strength. In the present embodiment, the stays 2 are joined and bundled to form a single structure and achieve higher structural strength as a whole. Further, this structure of the stays 2 enables to prevent or reduce unwanted vibrations caused by wind or airflow, compared with the case where the respective stays 2 are standing alone and not joined together.

Next, a mechanism of bird strike prevention according to the present embodiment is described.

When the airplane 100 flies close to the bird B as illustrated in FIG. 1 and the bird B is at a position over a center area of the air intake 111, the bird B would be ingested into the jet engine 110 if no prevention measure against the bird strike were provided. On the other hand, the possibility of ingesting the bird B decreases when the bird B is at a position over a peripheral area of the air intake 111.

In the present embodiment, the stays 2 are joined together and covered by the cap 3 at the top of the bird strike prevention device 1. The stays 2 are arranged such that the gap between the adjacent stays 2 decreases as nearing the top of the stays 2. Thus, the bird B flying over the center area of the air intake 111 may hit the stays 2 at part where the gaps between the adjacent stays 2 are narrower, making it possible to deflect the bird B away from the air intake 111.

This structure enables to securely deflect the bird B flying over the center area of the air intake 111. Further, the bird strike prevention device 1 enables to disperse and absorb the force on impact with the cap 3 and all the stays 2.

In the example illustrated in FIG. 2 to FIG. 4, the ten stays 2 are used. Alternatively, the number of the stays 2 may be increased or decreased depending on the size of the air intake 111, sizes of target birds to be deflected, etc.

When more stays 2 are used, the gaps between the adjacent stays 2 become narrower, thereby making it possible to deflect smaller birds and reduce the risk of bird strike. On the other hand, when the number of stays 2 is increased, the total weight of the bird strike prevention device 1 increases, and the possibility of introducing turbulence in airflow to the air intake 111 increases as well.

In the present embodiment, the number of stays 2 included in the bird strike prevention device 1 is determined based on a minimum size of target birds to be deflected by the bird strike prevention device 1. For example, the number of the stays 2 is determined in such a way that the gaps formed between the adjacent stays 2 at immediately below the cap 3 are smaller than a minimum size of target birds to be deflected. This arrangement enables to protect the jet engine 110 against direct hits of the target birds at least near at a center area of the air intake 111.

In the present embodiment, all the stays 2 have substantially the same diameter. Alternatively, of the stays 2 included in the bird strike prevention device 1, a plurality of the stays 2 may have a diameter different from that of the remaining members of the stays 2, and be arranged such that smaller diameter stays 2 are disposed between larger diameter stays 2. For example, to deflect larger birds, stays 2 with a larger diameter are used on the top and bottom, but smaller stays 2 are used on the sides to help block smaller birds with tend to fly with greater lateral dexterity than the larger birds.

In another embodiment, a net member or a lateral member may be disposed across the stays 2 to ensure the deflection and prevent the penetration of birds.

Further, in the present embodiment, the stays 2 have a straight line shape. However, the shape of the stay 2 is not limited thereto. For example, the stay 2 may have an arc shape bulging outward or inward, or a waveform shape in which these arc shapes or parts thereof are combined. When the stay 2 having the arc shape bulging outward is used to form the bird strike prevention device 1, the stays 2 forms a cup-like shape as a whole. Alternatively, the stay 2 may have a spiral shape winding about the cap 3. Further, the stay 2 may have various shapes and structures if need arises.

In the present embodiment, the stays 2 are fixed at the ring 4 so as to have the equal spacing between the adjacent stays 2 on the ring 4. However, the arrangement of the stays 2 on the ring 4 is not limited to that of the present embodiment. For example, a group of the stays 2 on the side closer to the earth surface may be arranged to have narrower gaps compared to the other stays 2 on the side away from the earth surface. This facilitates more deflection capability against birds flying closer to the earth surface.

Further, in the present embodiment, the one end of the stay 2 is fixed at the ring 4, and the ring 4 is used to fix the bird strike prevention device 1 on the jet engine 110. However, the fixing method of the stay 2 to the jet engine 110 is not limited thereto. For example, in FIG. 3, the protruding connection portion 5 may be directly formed at the end of each stay 2 and used to fix the stay 2 directly on the jet engine 110. This arrangement eliminates the need of the ring 4, simplifies the structure, and reduces the weight.

Second Embodiment

Next, the second embodiment is described with reference to FIG. 5A/B to FIG. 9. As is the case with the first embodiment, the second embodiment is directed to the bird strike prevention device 1 mounted over the air intake 111 of the jet engine 110 of the airplane 100 as illustrated in FIG. 1.

Figure 5A:
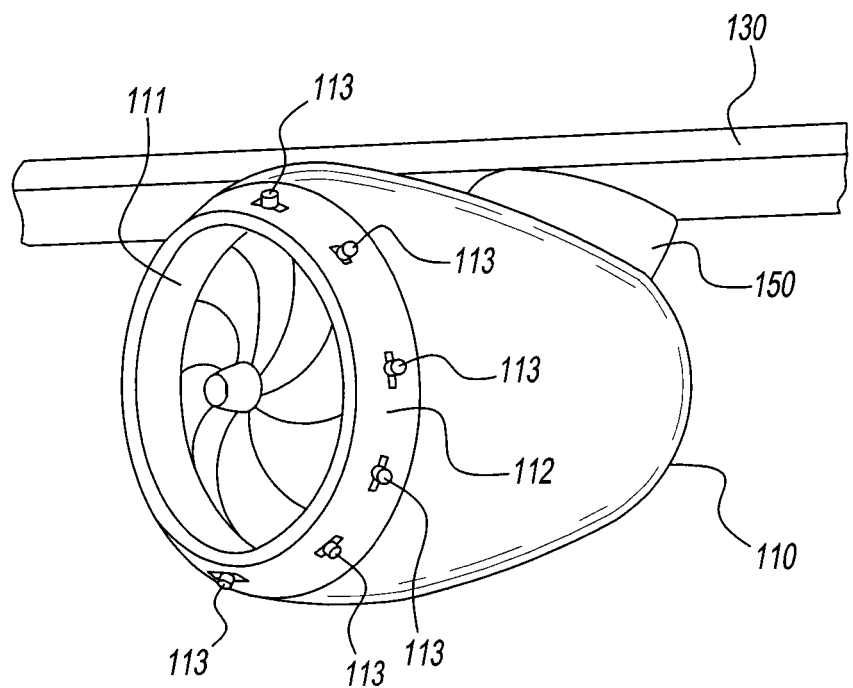
FIGS. 5A and 5B are perspective views illustrating an airplane jet engine on which a bird strike prevention device according to a second embodiment is mounted.
Figure 5B:
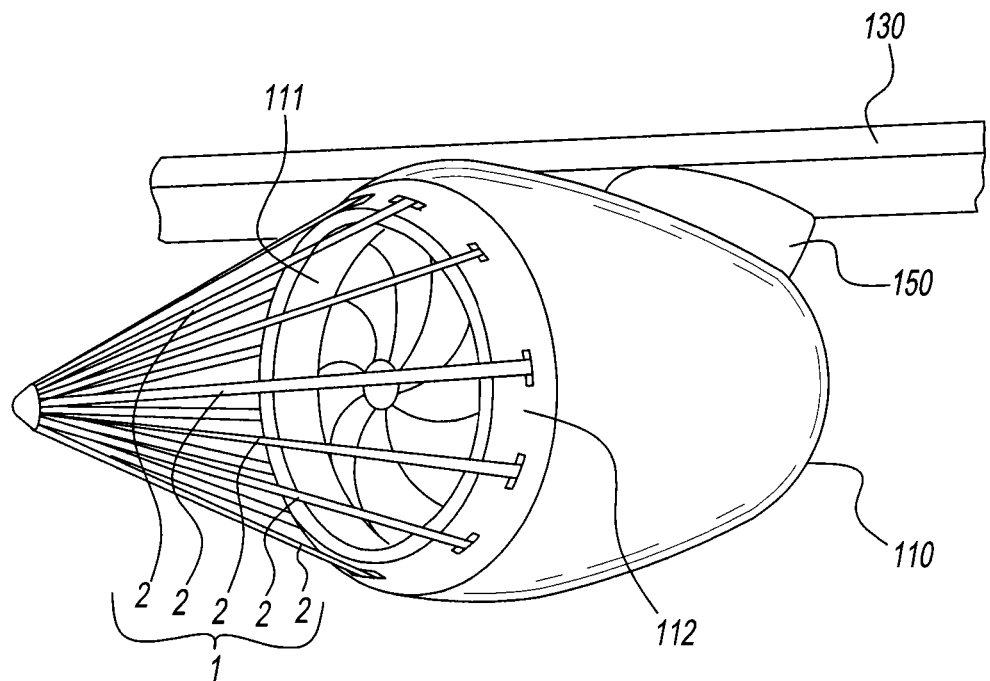

Referring to FIG. 5B, the bird strike prevention device 1 of the present embodiment has substantially a conical shape as a whole and covers the air intake 111 in such a way that the axis of the bird strike prevention device 1 substantially coincides with that of the jet engine 110, as in the case with the first embodiment.

However, in the present embodiment, the stays 2 are configured such that each stay 2 can be retracted and stowed under a skin cover (exterior surface) 112 of the jet engine 110 through openings 113 formed on the skin cover 112 as illustrated in FIG. 5A. In other words, the stays 2 are configured to have two operation modes, a mode in which the air intake 111 is covered (first operation mode) and a mode in which the air intake 111 is not covered (second operation mode).

The bird strike prevention device 1 further include a driver mechanism configured to change positions of the plurality of stays 2 relative to the air intake 111 to change the operation mode between the first operation mode and the second operation mode. The driver mechanism will be described in detail below.

The switching between these two operation modes may be executed in response to a control signal to be inputted to the driver mechanism (controlled by processing circuitry such as a programmed CPU, ASIC or PAL). For example, the control signal may be sent from a pilot of the airplane 100 or a controller circuit (included in driver 9) that automatically transmits the control signal to initiate the switching of operation mode when predetermined conditions regarding airplane's altitude, location, time, and the like are satisfied. The altitude, the location, and the time may be measured with an altimeter, a GPS, and the like installed in the airplane 100.

FIG. 6A and FIG. 6B illustrate an example of the stay 2. Here, the stay 2 includes a plurality of telescopic portions 7, a catch portion 8, and a telescope driver 9. The catch portion 8 is disposed at the front end of the stay 2, and the telescope driver 9 is disposed at the other end of the stay 2. The telescopic portions 7 have progressively smaller diameters and are nested within each other. The telescopic portions 7 are arranged such that the smallest diameter telescopic portion 7 is connected to the catch portion 8, and the largest diameter telescopic portion 7 is connected to the telescope driver 9.

The telescopic portions 7 of the stay 2 are configured not to turn about its axis when the telescopic portions 7 are extended so as to maintain the relative angle between the adjacent catch portions 8. This condition is desirable to ensure the engagement between the adjacent stays 2 when they are extended and achieve the second operation mode.

For example, as a structure for prevent such turning of the telescopic portion 7, the telescopic portions 7 may be provided with guide portions such as recesses and matching protrusions so as to extend and collapse without turning about the axis of the telescopic portions 7. Such recesses and protrusions may be formed on the outer and inner surfaces of the adjacent telescopic portions 7.

Alternatively, the telescopic portions 7 may have a polygon shape cross-section such as rectangle, triangle, or the like, or an oval shape cross-section. Such cross-section structures also enable to prevent the telescopic portions 7 from turning about the axis thereof when they are extended.

Referring to FIG. 6A, when the stay 2 is retracted, the telescopic portions 7 are collapsed, and the catch portion 8 is stowed under the skin cover 112 through the opening 113. The telescopic portions 7 can be extended and collapsed by the telescope driver 9.

Figure 7A:
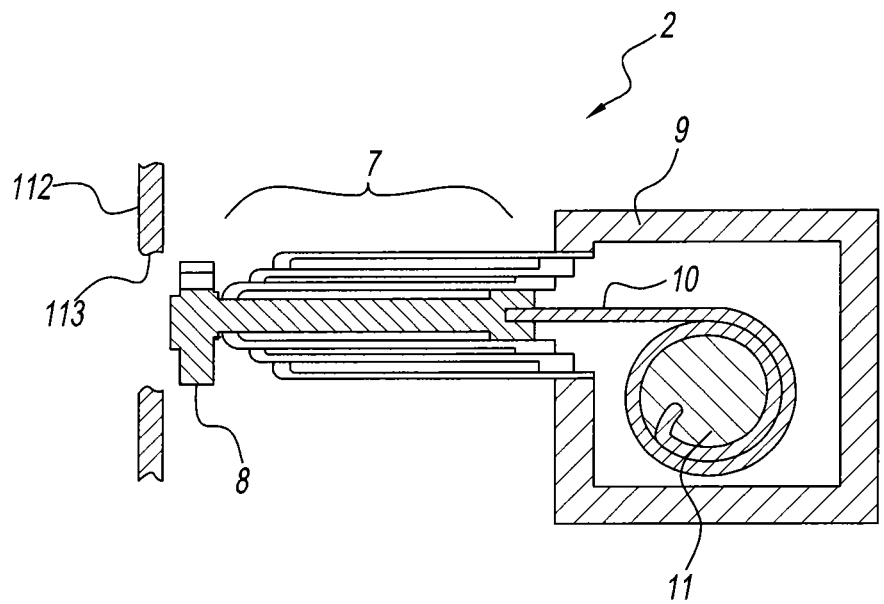
FIG. 7A and FIG. 7B are schematic cross-sectional views illustrating cross-sections of a telescope driver mechanism according to the second embodiment.
Figure 7B:
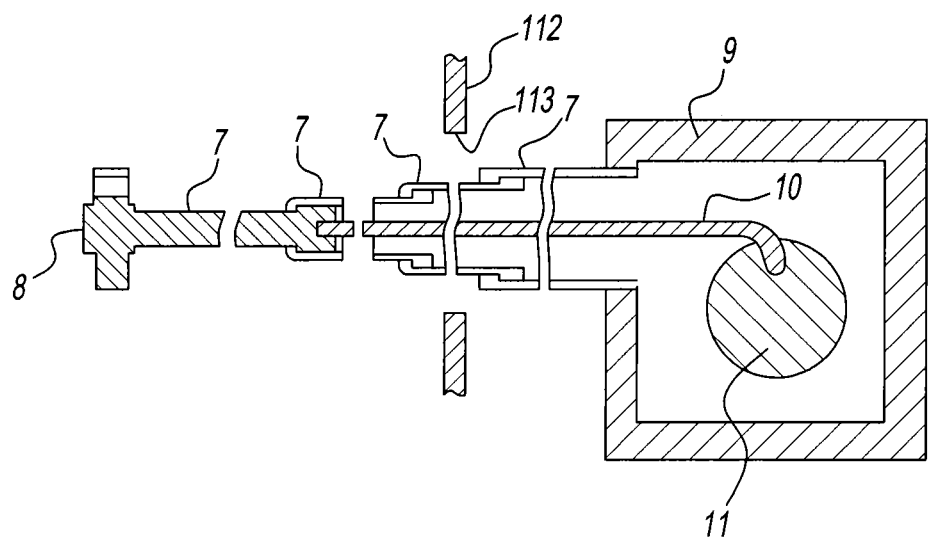

FIGS. 7A and 7B are the cross-sectional views of FIG. 6A and FIG. 6B, respectively, and depict the positions of the stay 2 and internal configurations when the stay 2 is collapsed and extended by the telescope driver 9. The telescope driver 9 includes a wire drum 11 that spools up a wire 10. The wire drum 11 is housed within the telescope driver 9. One end of the wire 10 is fixed to the wire drum 10, and the other end is connected to the end of the forefront telescopic portion 7.

When the wire drum 11 starts to rotate in the counter-clockwise direction at the operation mode illustrated in FIG. 7A, the stay 2 gradually extends due to stiffness of the wire 10 and eventually achieves the operation mode illustrated in FIG. 7B. The reverse transition may similarly be achieved by rotating the wire drum 11 in the clockwise direction.

In the present embodiment, each stay 2 includes its telescope driver 9. However, the configuration of the telescope driver 9 is not limited thereto. Instead of using the same number of telescope driver 9 as the stays 2, a single unit of driver or lower number of driver units may be employed to drive all the stays 2. When the single or lower number of driver units is employed, a power transmission mechanism may be utilized to transmit drive power from a power source such as a motor to each stay 2.

For example, the bottom portions of the respective stays 2 may be connected to wires, and the wires are connected to a single wire drum or a plurality of wire drums driven by a single motor. Each wire may be guided through a conduit that is laid on the outer surface or the inner surface of the skin cover 112 from the bottom of stay 2 to the corresponding wire drum.

In the present embodiment, the stay 2 may be alternatively formed of a single rod member. The single rod member may be moved back and force in its length direction with a drive mechanism in response to changes of the operation mode.

Further, when the stays 2 are collapsed, the stay 2 may be alternatively stowed in such a way that part of the stay 2 is protruded out of the opening 113, without storing the whole of the stay 2 under the skin cover 112.

Still further, the stays 2 may not be stowed under the skin cover 112. For example, the whole of the stay 2 including the telescope driver 9 may be mounted on the outer surface of the skin cover 112. This arrangement makes maintenance of the stays 2 easy to perform.

Figure 8:
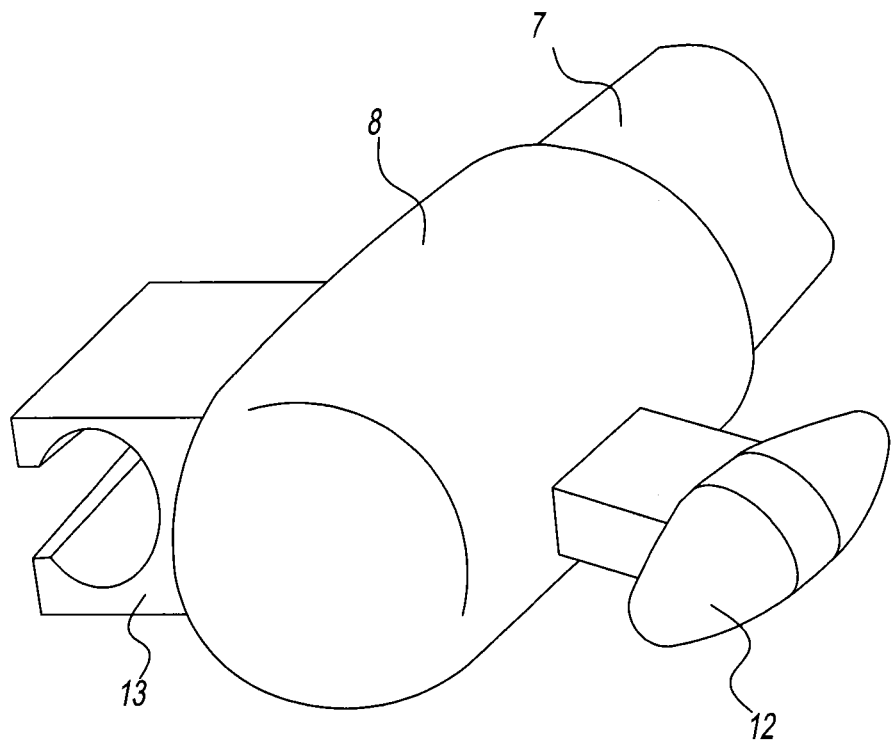
FIG. 8 is a perspective view illustrating a joining portion disposed on a tip portion of the stay according to the second embodiment.

Referring to FIG. 8, the catch portion 8 is formed at the tip portion of the stay 2. In the present embodiment, the catch portion 8 serves as the joining portion for connecting the stay 2 with the adjacent stay 2.

The catch portion 8 is provided with a male catch piece 12 on one side and a female catch piece 13 on the other side in the circumferential direction. The male catch piece 12 of one stay 2 and the female catch piece 13 of the adjacent stay 2 are designed to engage with each other and form a connection between them.

The male catch piece 12 includes a shaft piece, and the female catch piece 13 includes a tube piece. For example, the shaft piece may be a tapered shaft-shaped or a spindle-shaped, and part of the tube piece may be cut off to open inside to catch the shaft piece of the male catch piece 12 and allow it to slide through to a lock position and complete the engaging action.

Alternatively, the female catch piece 13 may be a funnel-shaped with a tapered opening at the rear and part of which is cut off to allow the shaft piece to slide to a lock position. This funnel-shaped female catch piece 13 makes it easy to catch and engage with the male catch piece 12.

In another embodiment, the catch portion 8 may be configured such that the male catch piece 12 or the female catch piece 13 or both are capable of turning in the circumferential direction of the catch portion 8. This configuration allows to absorb variation in relative spatial relationship between the catch portions 8 of the adjacent stays 2 when the stays 2 are being extended, thereby facilitating the engaging of the adjacent stays 2.

This configuration also allows the use of common structure stays 2 for the bird strike prevention devices 1 with different number of stays 2 for jet engines with different sizes or types. When the number of the stays 2 that form the bird strike prevention device 1 changes, the angle between the male catch piece 12 and the female catch piece 13 in the circumferential direction needs to be adjusted to secure smooth engagement between the adjacent stays 2 and to connect all the stays 2 together.

Figure 9:
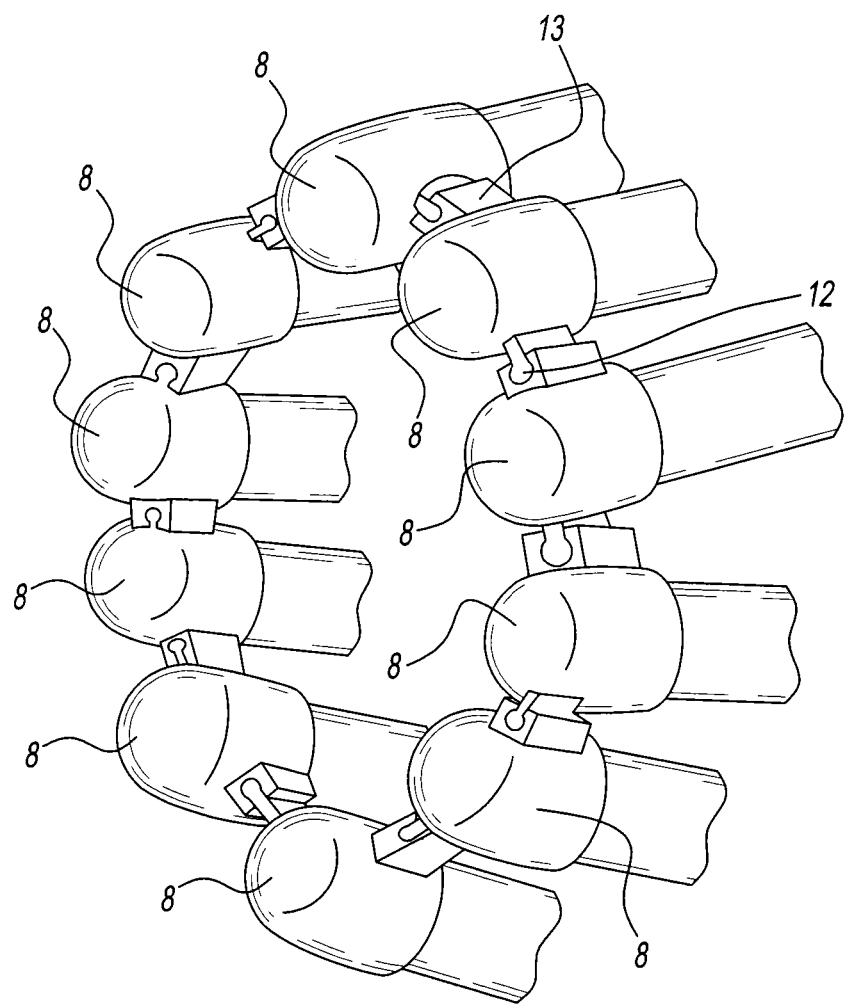
FIG. 9 is a perspective view illustrating top part of the bird strike prevention device according to the second embodiment where the joining portions of stays are connected to each other.

Referring to FIG. 9, when the stays 2 are extended and covering the air intake 111 of the jet engine 110 as illustrated in FIG. 5B, the stays 2 are connected to each other at the tip portion of the bird strike prevention device 1. Here, the catch portions 8 of adjacent stays 2 are engaged with each other, allowing all the ten stays 2 to be connected in series and form a circle. Engaging the adjacent catch portions 8 and connecting all the stays 2 allow to form a single structure of the bird strike prevention device 1.

The number of the stays 2 included in the bird strike prevention device 1 is determined in such a way that the gaps formed between the adjacent stays 2 at immediately below the part connected by the catch portions 8 are smaller than a minimum size of target birds to be deflected. Further, in the present embodiment, the diameter of the circle formed by connected catch portions 8 is set smaller than the minimum size of target birds to be deflected. This arrangement enables to protect the jet engine 110 against direct hits of the target birds at least flying near at a center area of the air intake 111.

In the bird strike prevention device 1 according to the present embodiment, the stays 2 are joined together with the catch portions 8 at the top, making it possible to securely deflect the bird B at the position over the center area of the air intake 111. Further, the bird strike prevention device 1 enables to disperse and absorb the force on impact with all the stays 2.

Further, in the present embodiment, the stays 2 are configured to have two operation modes, the first operation mode in which the air intake 111 is covered and the second operation mode in which the air intake 111 is not covered. The switching between these two operation modes may be executed in response to a control signal to be inputted to the telescope drivers 9 of the stays 2.

For example, the stays 2 may be extended to cover the air intake 111 only during takeoff and landing, during which the possibility of bird strikes with endemic bird species is high. The stays 2 may be stowed so as not to cover the air intakes 111 when the airplane 100 is cruising at high altitude where the possibility of bird strike is low. This prevents possible disturbances in airflow to the air intake 111. Alternatively, the stays 2 may be extended to cover the air intake 111 even at high altitude when the airplane 100 is cruising near an expected bird migratory path.

In the present embodiment, the stays 2 may be configured to be extended and collapsed in the foregoing two operation modes. This makes it possible to stow all the stays 2 under the skin cover 112 of the jet engine 110 when the stays 2 are collapsed.

Further, in another embodiment, the bird strike prevention device 1 may include two or more sets of the stays 2 that are concentrically overlaid on top of each other. The sets of the stays 2 may be the same type such as one according to the second embodiment with the telescope driver 9 illustrated in FIG. 5A and FIG. 5B, or different types such as one according to the first embodiment without the telescope driver 9 illustrated in FIG. 3 and one according to the second embodiment with the telescope driver 9.

For example, two sets of the stays 2 may be mounted on a single jet engine 110. The two sets may include one set of the stays 2 according to the first embodiment and the other set according to the second embodiment. In that case, the set of stays 2 according to the second embodiment may be extended or collapsed during takeoff and touchdown whereas the set of stays 2 according to the first embodiment may be fixed throughout the flight.

In the foregoing description of the embodiments, the bird strike prevention device 1 is described with the examples where the bird strike prevention device 1 is mounted on the passenger airplane 100 with the twin jet engines 110 suspended under the wings 130. However, the embodiments are not limited thereto. The bird strike prevention device 1 may also be mounted on airplanes including a higher number or lower number of jet engines, a jet engine mounted near the tail 140, jet engines mounted above the wings 130, or the like. Further, the airplane 100 may alternatively be a cargo airplane or the like, instead of the passenger airplane.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A bird strike prevention device for protecting an air intake of a jet engine of an airplane, the bird strike prevention device comprising:
   a plurality of stays arranged to form substantially a multi-faceted conical shape; and
   a joining portion configured to connect the plurality of stays to each other on an apex side of substantially the multi-faceted conical shape, wherein
   the plurality of stays are mounted on the jet engine near an outer edge of the air intake at a base of substantially the conical shape,
   an axis of substantially the multi-faceted conical shape substantially coincides with a rotation axis of the jet engine,
   a number of the stays is 8 or less,
   the plurality of stays are metallic, between 6 and 20 feet in length, and each angled from the joining portion away from the rotation axis of the jet engine between 11.5 and 41 degrees
   the plurality of stays are configured to be deployed in front of the air intake in a first operation mode and retracted away from the air intake in a second operation mode
   the joining portion is composed of a plurality of catch portions, each catch portion being disposed on the apex side of each of the plurality of stays,
   the catch portions of adjacent stays are engaged with each other when in the first operation mode and disengaged when in the second operation mode,
   the catch portion includes a male catch piece and a female catch piece, and
   the male catch piece and the female catch piece are arranged on each stay so that the male catch piece of one stay engages with the female catch piece of an adjacent stay when the plurality of stays cover the air intake in the first operation mode.

2. The bird strike prevention device according to claim 1, wherein the stays are distributed asymmetrically, such that more stays are distributed around a bottom and top of the device than on sides of the device.

3. The bird strike prevention device according to claim 1, wherein
   the stay is mounted on the jet engine so that the stay is capable of sliding relative to the air intake in a length direction of the stay, and
   the plurality of stays extends over the air intake and achieves the first operation mode when each of the plurality of stays is slid forward, and uncovers the air intake and achieves the second operation mode when each of the plurality of stays is slid backward.

4. The bird strike prevention device according to claim 1, wherein the plurality of stays is stowed under a skin cover of the jet engine when the plurality of stay uncovers the air intake and achieves the second operation mode.

5. An airplane including a jet engine and an altimeter, the airplane comprising:
- a bird strike prevention device according to claim 1 mounted on the jet engine for covering an air intake of the jet engine, wherein
- the driver mechanism receives a signal indicative of altitude of the airplane and controls an operation to change the positions of the plurality of stays based on the signal received.

6. The bird strike prevention device according to claim 1, further comprising:
- a driver mechanism configured to change positions of the plurality of stays relative to the air intake to change the operation mode between the first operation mode and the second operation mode.

7. The bird strike prevention device according to claim 6, wherein
- the driver mechanism includes a plurality of drivers, and
- each of the plurality of drivers changes the position of a corresponding unit of the stays relative to the air intake.

8. The bird strike prevention device according to claim 6, further comprising:
- a controller having circuitry configured to control an operation of the driver mechanism based on an altitude of the airplane.

* * * * *